Patented Apr. 22, 1952

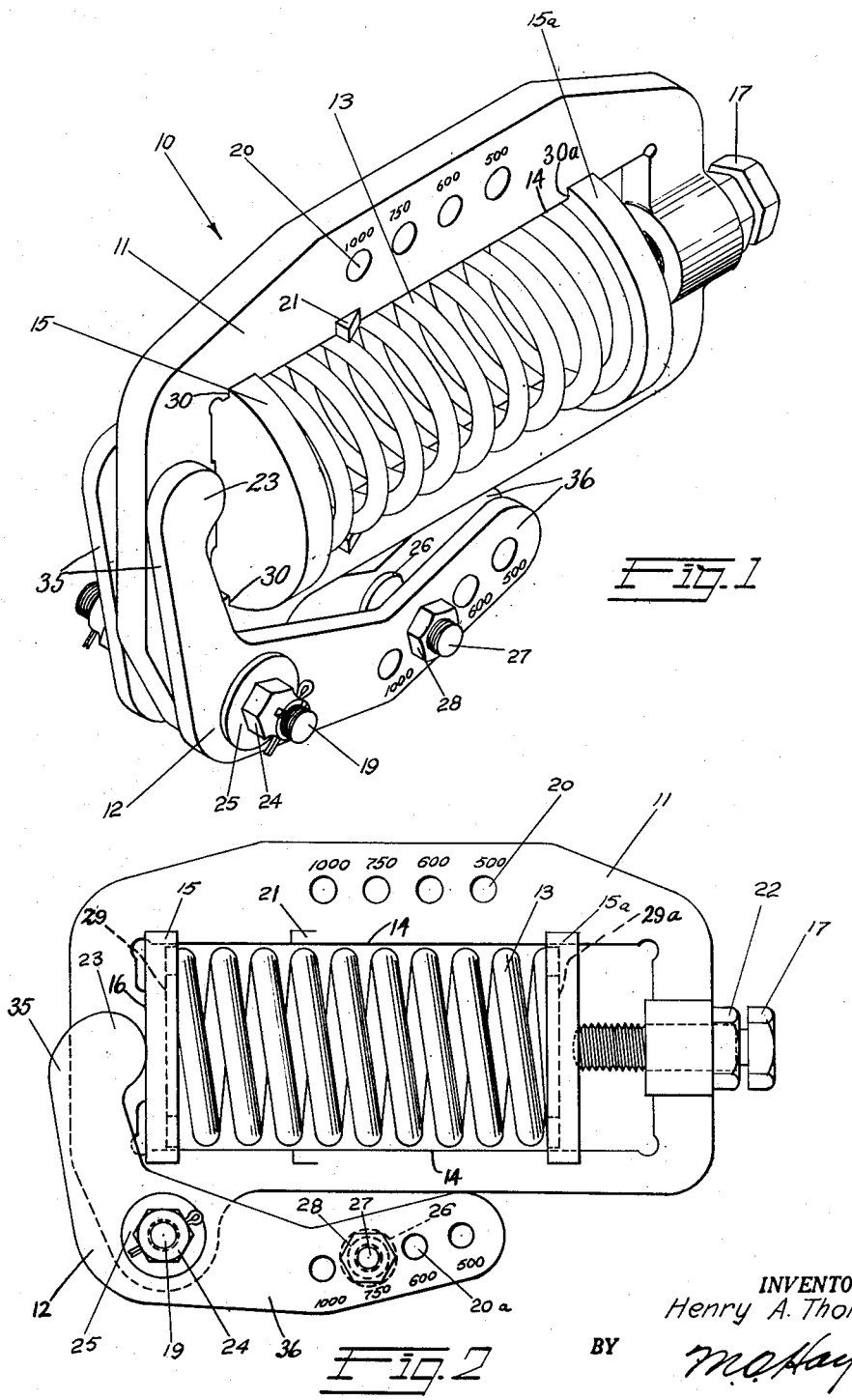

2,593,502

UNITED STATES PATENT OFFICE 2,593,502

SPRING HANGER

Henry A. Thomson, Lansdowne, Pa.

Application January 16, 1946, Serial No. 641,550

9 Claims. (Cl. 248—54)

(Granted under the act of March 3, 1883, as amended April 30, 1928; 370 O. G. 757)

This invention relates to the art of spring hangers, and it comprises apparatus for supporting a load in balance against the resiliency of a spring. One use of the invention is for the positioning of piping and the like.

In the installation of pipe lines it is frequently necessary to provide a flexible mounting which supports the pipe in a predetermined position, and which permits relative motion between the pipe and the structure on which the pipe is mounted. This has previously been accomplished by means of a spring mounting in which the pipe is mounted on a vertical coil spring which permits the pipe to move up or down in a springing motion. The previous method has numerous disadvantages; e. g., the weight and size of the spring must be closely correlated with the weight and size of the pipe line to be suspended thereby, and failure to obtain this close correlation causes irregularities in the pipe line and also causes either too great or too little flexibility in the mounting. Another disadvantage is that these vertical springs are relatively bulky and require a substantial separation between the pipe line and the structure on which the pipe line is mounted.

Accordingly it is an object of this invention to provide a compact and adjustable spring mounting.

It is another object of this invention to provide an adjustable compact spring mounting for pipe lines and the like wherein the strength and position of the spring may be readily adjusted to conform with the size and the weight of the pipe line.

Further objects and advantages of this invention, as well as its construction, arrangement and operation, will be apparent from the following description and claims in connection with the accompanying drawing, in which Figure 1 is an isometric view of the spring mounting means according to one embodiment of the invention, and Figure 2 is a side elevation of the article shown in Figure 1.

A spring hanger, generally designated 10, comprises a frame 11 for the spring 13, a compression spring being employed in the preferred embodiment of the disclosure. The spring 13 is displaced by motion-transmitting mechanism comprising the rocker arm or bell-crank lever 12, which operates under action of the load to compress a spring 13 which is positioned within frame 11.

The frame 11 is a substantially flat, rectangular member having an elongated aperture or opening 14 adapted to receive and house spring 13. The frame extends around the spring 13 lengthwise. Its aperture or opening 14 comprises opposite sidewalls alongside the spring on respective opposite sides of its axis and parallel thereto, and also comprising end walls connecting the side walls.

End-engaging members 15 and 15a for the respective opposite ends of the spring 13 constitute contact plates which bear against their respective corresponding spring ends. The plate 15a is stationary and is pressed between its corresponding spring end and the proximate end wall of the frame aperture 14, thereby being held stationary. The screw 17 is threaded through the end wall of frame 11 opposite the plate 15a coaxially with the spring 13, and its end bears against the plate 15a to compress the spring. The screw 17 provides an adjustment for varying the position of the plate 15a to adjust the tension of the spring 13, the lock nut 22 being provided to lock the screw 17 in position of adjustment.

The plate 15 is movable, and is actuated by the motion-transmitting mechanism of bell-crank lever 12. Lever 12 is pivoted at 19 and comprises the abutment end or finger 23 at the end of its arm 35. The motion-transmitting mechanism of lever 12 comprises an extension away from the abutment end 23 which includes the lever arm 36 alongside the spring 13, the arm 36 being disposed adjacent to one side wall of frame aperture 14 to thereby be on the opposite side of the spring axis from the other side wall. By this means the load is applied transversely through the axis of the spring 13.

Opposed attachments for the load comprise the holes 20 and the holes 20a on respective opposite sides of the axis of spring 13, both load attachments of holes 20 and 20a being pivotal on axes that are transverse to the axis of the spring 13. Holes 20 are embodied in the side wall of the frame 11 opposite the lever arm 36, a plurality of holes 20 being provided arranged lengthwise of the spring 13 for adjusting the hanger 10 for loads of different magnitude. The load attachment of holes 20a is in the arm 36 of lever 12 on the side of the spring axis opposite the holes 20, there being a plurality of holes 20a provided corresponding with the holes 20 to complete adjustment of the hanger 10 for loads of different magnitude.

The motion-transmitting mechanism of lever 12 operates at the end of the spring engaged by the movable plate 15, and the pivot of lever 12 comprises the bolt 19 located as shown at the end of the frame 11 proximate to the plate 15. The bolt 19 passes through the frame 11, and provides a pivot pin for the lever 12, the castellated nuts 24 and washers 25 being provided to complete the attachment of lever 12. One arm 35 of the lever 12 includes the abutment finger 23 which bears against the contact plate 15 when the lever 12 supports a load. The other arm 36 of the lever 12 is positioned substantially parallel with the center line of the spring 13.

As will be seen in Fig. 1, the rocker arm 12 is bifurcated to straddle the frame 11, the rocker arm 12 consisting of two pieces respectively disposed on opposite sides of the frame 11. The two pieces of lever 12 are connected by the bolt 27 and nut 28. The two pieces of the lever are held in fixed spaced relationship, the spool or sleeve 26 on the bolt 27 constituting a spacer member.

The bolt 27 is selectively positionable in any of the several holes 20a which are arranged disposed along the load engaging arm 36 of the lever 12. The bolt 27 is selectively positioned in any of the holes 20a alternatively, a given hole being selected in accordance with the load to be accommodated. By this means the moment of the lever arm 36 is adjusted for the given load to attain balancing equilibrium under tension of the spring 13. The several holes 20a are preferably appropriately marked, as illustrated in the drawing, to indicate the load that the hole is adapted to carry.

In the upper part of the frame 11 are located a series of spaced holes 20, the several holes being numbered for convenience to indicate different loads. The hanger 10 is adapted to be connected to some rigid support by any suitable means including a bolt, pin or the like inserted in a selected one of the holes 20. A hole 20 is selected with reference to the load to be carried for the spring 13 to extend approximately horizontally under load, the lighter the load the longer the lever arm corresponding required for proper suspension. The several holes 20 are appropriately marked, as illustrated, to indicate the hole to be used for a given load. It will be noted that the several holes 20 are positioned approximately vertically above correspondingly marked holes 20a, whereby the load hangs approximately vertically downwardly from its point of attachment to the rigid support.

Also positioned on the frame and adjacent to the central opening 14 are a plurality of stops 21 which are adapted to limit movement of the contact plate 15 under action of the lever 12. When the hanger 10 is under load, abutment finger 23 of lever 12 engages the abutment plate 15 concentrically thereof on opposite sides of the frame 11. The finger 23 operates to actuate the spring 13 under compression to an extent limited by the stops 21. The extent of movement of the plate 15 is limited in two directions by the abutment surface 16 and the stops 21 of the frame 11. The proper hole 20a is selected in accordance with the weight of the load, the corresponding hole 20 having been selected also, for the load to be suspended in balance under tension of the spring 13.

The tension of the spring 13 is adjustable to vary it according to the weight of load to be carried, this adjustment operating to locate the abutment plate 15 suspended in balance somewhere between the abutment stops 16 and 21.

The adjustment is accomplished by means of the adjusting screw 17, which is advanced to move the plate 15a towards the plate 15 to shorten the spring 13 and increase its tension, or retracted to elongate the spring 13 and reduce its tension. The lock nut 22 is operated to set the adjustment of screw 17 to whatever spring tension is established. Adjustment of the spring tension by operation of the screw 17 is preferably made after the hanger 10 is loaded, the screw 17 being operated until the abutment plate 15 moves to a position approximately midway between the abutment stops 16 and 21. Then the load is properly suspended in balance.

The pressure applied through the plate 15 to the spring 13 is longitudinally thereof, and is opposed by the abutment plate 15a. Plate 15 is provided with diametrically opposite keyways 30, plate 15a being provided with similar diametrically opposite keyways 30a. Keyways 30 and 30a engage the companion guiding edges 14 of the frame 11, and this guiding means operates to limit movement of the plates 15 and 15a towards or away from each other in a straight line direction longitudinally of the center line of the spring 13. The plates 15 and 15a respectively are recessed at 29 and 29a for seating opposite ends of the spring 13, and to hold the plates in abutting engagement with respective opposite spring ends.

It will be noted that when the hanger 10 is in use supporting a load, the spring 13 is directed approximately horizontally, the holes 20a and 20 having been selected for this purpose in accordance with the magnitude of the load. The arm 36 of the lever 12 to which the load is attached is also disposed approximately horizontally and approximately parallel with the spring 13. The force of the load is directed vertically downwardly, applied to the spring 13 in a horizontal direction longitudinally thereof by the lever 12, the force being directed vertically downwardly from the point of suspension of the rigid support.

The device of the invention is simple and inexpensive, and can be installed and adjusted easily to support any load within a wide range of magnitudes. The construction of the hanger of the present invention is compact, and has added merit for use in places having low overhead clearances.

It is to be understood that various modifications and changes may be made in this invention without departing from the spirit and scope thereof as set forth in the appended claims.

The invention described herein may be manufacured and used by or for the Government of the United States of America for governmental purposes without the payment of any royalties thereon or therefor.

What is claimed is:

1. A spring hanger for supporting a load resiliently comprising a coil spring, opposed load and adjustment contact-members respectively engaging respective opposite ends of the spring, a frame for the spring comprising guideways for the contact-members to direct their movements towards or away from each other longitudinally of the spring, adjusting means operable opposed to the frame to position the adjustment contact-member towards or away from the load contact-member to set tension of the spring to a predetermined magnitude, and an attaching member for the load comprising a lever supported rotatably on the frame, the load being attachable to one arm of the lever, the other arm of the lever operating through the load contact-member to hold the load in balance against the tension of the spring.

2. A spring hanger for supporting a load resiliently comprising a coil spring, opposed contact-members respectively engaging opposite ends of the spring, a frame for the spring comprising guideways for the contact-members directing their movements towards and away from each other longitudinally of the spring, an adjusting screw operable in the frame to position one of the contact-members towards or away from the other contact-member to set tension of the spring to a predetermined magnitude, an attaching member for the load comprising a lever supported rotatably on the frame, the load being attachable to one arm of the lever, the other arm of the lever urging one contact-member towards the other contact-member to hold the load in balance against the tension of the spring, the frame comprising means for attaching the hanger adjustably for supporting loads of different magnitude.

3. A spring hanger for supporting a load resiliently comprising a coil spring, opposed contact-members respectively engaging opposite ends of the spring, a frame for the spring comprising guideways for the contact-members directing their movements towards or away from each other longitudinally of the spring, adjusting means operable opposed to the frame to position one of the contact-members towards or away from the other contact-member to set tension of the spring to a predetermined magnitude, an attaching member for the load comprising a lever supported rotatably on the frame, the load being attachable to one arm of the lever, adjustably for supporting loads of different magnitude, the other arm of the lever urging one contact-member towards the other contact-member to hold the load in balance against the tension of the spring.

4. A spring hanger for supporting a load resiliently comprising a compression spring, a flat frame including an elongated aperture to house the spring with its axis in fixed position relative to the frame, opposed load and adjustment abutment-members respectively engaging opposite ends of the spring, and comprising keyways engaging the frame to confine movements of the abutment members towards and away from each other longitudinally of the axis of the spring, an adjustment screw operable in the frame at one end thereof to position the adjustment abutment-member towards or away from the load abutment-member to set tension of the spring to a predetermined magnitude, an attaching member for the load comprising a lever supported rotatably on the frame, the load being attachable to one arm of the lever, the other arm of the lever urging the load abutment-member towards the adjustment abutment-member to hold the load in balance against the tension of the spring.

5. A spring hanger comprising a compression coil spring, a rigid frame with an aperture housing the spring and comprising opposite side walls disposed parallel with and on respective opposite sides of the axis of the spring and also comprising opposite end walls positioned beyond the respective opposite ends of the spring disposed transversely to the axis thereof and connecting the opposite side walls of the frame, a stationary and a movable end-engaging member for respective opposite ends of the spring and comprising each a contact plate bearing against its corresponding spring end, the stationary plate being held pressed between the spring and the frame and thereby being held stationary, a bell-crank lever mounted on the frame pivotally on an axis transversely to the axis of the spring, one arm of the lever engaging the movable contact plate to actuate it, the other arm of the lever extending alongside the spring adjacent to one of the side walls of the frame, opposed attachments for the load on respective opposite sides of the axis of the spring, one load attachment being on the arm of the lever that extends alongside the spring, the other load attachment being on the opposite side wall of the frame, both load attachments being pivotal on axes disposed transversely of the axis of the spring.

6. In a spring hanger as defined in claim 5, the load attachments on respective opposite sides of the spring axis being adjustable lengthwise thereof to adjust the hanger to loads of different magnitude.

7. In a spring hanger as defined in claim 5, the side walls of the frame comprising a guideway for the movable contact plate.

8. In a spring hanger as defined in claim 5, the end wall of the frame proximate to the movable contact plate comprising a stop limiting the extent of spring displacement in the direction of expansion.

9. In a spring hanger as defined in claim 5, the frame comprising stops limiting movement of the movable contact plate in respective opposite directions to limit the extent of spring displacement in both directions.

HENRY A. THOMSON.

REFERENCES CITED

The following references are of record in the file of this patent:

UNITED STATES PATENTS

| Number | Name | Date |
|---|---|---|
| 1,006,232 | Kraushaar | Jan. 17, 1911 |
| 1,816,164 | Wood | July 28, 1931 |
| 1,893,295 | Le Bailly | Jan. 3, 1933 |
| 1,937,135 | Wood | Nov. 28, 1933 |
| 2,156,468 | Wood | May 2, 1939 |
| 2,256,784 | Wood | Sept. 23, 1941 |
| 2,437,631 | Wood | Mar. 9, 1948 |